United States Patent
Kim et al.

(10) Patent No.: US 10,560,155 B2
(45) Date of Patent: Feb. 11, 2020

(54) INFORMATION TRANSMITTER (71) Applicant: WITS Co., Ltd., Yongin-si, Gyeonggi-do (KR)

(72) Inventors: Hee Seung Kim, Suwon-si (KR); Jae Hyuk Jang, Suwon-si (KR); Chang Hee Lee, Suwon-si (KR); Jae Sun Won, Suwon-si (KR); Hyo Jung Yoon, Suwon-si (KR); Gie Hyoun Kweon, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 17 days.

(21) Appl. No.: 15/684,014

(22) Filed: Aug. 23, 2017

(65) Prior Publication Data
US 2018/0102811 A1 Apr. 12, 2018

(30) Foreign Application Priority Data

Oct. 12, 2016 (KR) .......................... 10-2016-0132367

(51) Int. Cl.
*H04B 5/00* (2006.01)
*G06K 7/08* (2006.01)
*H02M 3/18* (2006.01)

(52) U.S. Cl.
CPC ......... *H04B 5/0031* (2013.01); *H04B 5/0087* (2013.01); *G06K 7/083* (2013.01); *H02M 3/18* (2013.01)

(58) Field of Classification Search
CPC .... H04B 5/0031; H04B 5/0087; G06K 7/083; H02M 3/18; H02M 7/5387
USPC ..................................................... 455/41.1
See application file for complete search history.

(56) References Cited

U.S. PATENT DOCUMENTS

| | | | | |
|---|---|---|---|---|
| 5,721,783 A | * | 2/1998 | Anderson | H04B 1/385 381/328 |
| 8,210,440 B1 | * | 7/2012 | Pinai | G06K 7/084 235/487 |
| 8,600,200 B1 | * | 12/2013 | Rakich | G02F 1/125 385/1 |
| 8,827,153 B1 | * | 9/2014 | Rhoades | G06K 19/06206 235/380 |
| 2004/0239662 A1 | * | 12/2004 | Hosokawa | G09G 3/3648 345/204 |
| 2006/0281405 A1 | * | 12/2006 | Villard | G06K 7/0008 455/41.1 |

(Continued)

FOREIGN PATENT DOCUMENTS

KR  10-2004-0090902 A  10/2004
KR  10-1584555 B1  1/2016

*Primary Examiner* — Edward F Urban
*Assistant Examiner* — Max Mathew
(74) *Attorney, Agent, or Firm* — Harness, Dickey & Pierce, P.L.C.

(57) ABSTRACT

An information transmitter includes a transmitting coil configured to receive a coil voltage to generate a magnetic field; and a signal generator configured to receive a direct current (DC) voltage and operating switches to apply the coil voltage to the transmitting coil, for a first time constant in a first current path, wherein the coil voltage includes a first value, and for a second time constant in a second current path, wherein the coil voltage includes a second value smaller than the first value, and wherein the first time constant and second time constant are different from each other.

11 Claims, 7 Drawing Sheets

(56) References Cited

U.S. PATENT DOCUMENTS

| | | | | |
|---|---|---|---|---|
| 2009/0322479 A1* | 12/2009 | Fukuda | ............... | G06K 7/0008 |
| | | | | 340/10.1 |
| 2013/0087622 A1* | 4/2013 | Collins | ............... | G06K 19/02 |
| | | | | 235/488 |
| 2014/0070006 A1* | 3/2014 | Weldele | ............... | G06K 7/084 |
| | | | | 235/449 |
| 2014/0266399 A1* | 9/2014 | Corman | ............... | H03K 17/002 |
| | | | | 327/415 |
| 2015/0054698 A1* | 2/2015 | Kerr | ............... | H01Q 5/328 |
| | | | | 343/745 |
| 2015/0244270 A1* | 8/2015 | Karlsson | ........... | H02M 3/33507 |
| | | | | 363/17 |
| 2015/0349849 A1* | 12/2015 | Joehren | ............... | H04L 27/06 |
| | | | | 455/41.1 |
| 2016/0027529 A1* | 1/2016 | Hoefler | ............... | G11C 11/408 |
| | | | | 365/154 |
| 2016/0054440 A1* | 2/2016 | Younis | ............... | G01S 13/753 |
| | | | | 342/5 |
| 2016/0182118 A1* | 6/2016 | Lam | ............... | H03H 2/005 |
| | | | | 455/78 |
| 2017/0248539 A1* | 8/2017 | Matsuda | ............ | F02D 19/0657 |

* cited by examiner

INFORMATION TRANSMITTER

CROSS-REFERENCE TO RELATED APPLICATION(S)

This application claims the benefit under 35 USC 119(a) of Korean Patent Application No. 10-2016-0132367, filed on Oct. 12, 2016 in the Korean Intellectual Property Office, the entire disclosure of which is incorporated herein by reference for all purposes.

BACKGROUND

1. Field

The following description relates to an information transmitter.

2. Description of Related Art

Wireless communications are applied in various applications. In particular, a wireless communications antenna in a form of a coil is applied to various devices in connection with the granting of electronic approval.

An information transmitter that wirelessly transmits and/or receives information using a coil has also recently been applied to electronic devices such as mobile terminals or wearable devices.

Since these electronic devices receive power from a power storage element such as a battery, power management is a very important issue.

Therefore, the information transmitter applied to electronic devices is also required to transmit information data in a low-power environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information transmitter, includes a transmitting coil configured to receive a coil voltage to generate a magnetic field; and a signal generator configured to apply the coil voltage to the transmitting coil, wherein the coil voltage comprises a first value during a first time constant in a first current path, the coil voltage comprises a second value during a second time constant in a second current path, the second value is less than the first value, and the first time constant and second time constant are different from each other.

The first time constant may be less than the second time constant.

The signal generator may be further configured to apply the coil voltage to the transmitting coil for a third time constant in a third current path, wherein the coil voltage comprises a third value of opposite polarity than the first value, and wherein the third time constant is less than the second time constant in the second current path.

The signal generator may be further configured to apply the coil voltage to the transmitting coil for a fourth time constant in a fourth current path, wherein the coil voltage may include a fourth value less than the third value and wherein the fourth time constant is greater than the third time constant in the third current path.

The first time constant may correspond to the third time constant, and the second time constant may correspond to the fourth time constant.

The first time constant may be determined by a coil resistance of the transmitting coil and an input resistance included in the signal generator, and the second time constant may be determined by the coil resistance of the transmitting coil.

The signal generator may include an input resistance; a first switch including a first terminal connected to the input resistance and a second terminal connected to a first terminal of the transmitting coil; a second switch including a first terminal connected to the second terminal of the first switch and a second terminal of the transmitting coil part; a third switch including a first terminal connected to the input resistance and a second terminal connected to the second terminal of the transmitting coil part; and a fourth switch including a first terminal connected to the second terminal of the transmitting coil and a second terminal connected to the second terminal of the second switch.

The first current path may be formed by operating the first switch and the fourth switch in an ON state and the second switch and the third switch in an OFF state.

The second current path may be formed after the first current path, and may be formed by switching the fourth switch to the OFF state and switching the third switch to the ON state.

The signal generator may be further configured to form a third current path after the second current path, by switching the first switch to the OFF state and switching the second switch to the ON state.

The signal generator may be further configured to form a fourth current path after the third current path, by switching the third switch to the OFF state and switching the fourth switch to the ON state.

A first amount of change of the magnetic field caused by the first current path may be greater than a second amount of change of the magnetic field caused by the second current path.

According to another general aspect, an information transmitter includes a transmitting coil configured to receive a coil voltage and generate a magnetic field; and a signal generator configured to receive a direct current (DC) voltage and operate switches to apply the coil voltage to the transmitting coil, wherein a first amount of change of a coil current flowing in a first current path in which the coil voltage including a first value is applied to the transmitting coil part, and a second amount of change of a coil current flowing in a second current path in which the coil voltage including a second value less than the first value is not applied to the transmitting coil are different from each other.

The signal generator may be configured to apply the coil voltage and the coil current to the transmitting coil for a first time constant in the first current path, and to apply the coil current for a second time constant in the second current path, and the second time constant may be greater than the first time constant, the transmitting coil being substantially devoid of the coil voltage during the second time constant.

A first amount of change of the magnetic field caused by the first current path may be different from a second amount of change of the magnetic field caused by the second current path.

The changes in the coil current caused by the first and second current paths may correspond to the changes in the magnetic field caused by the first and second current paths.

According to another general aspect, an information transmitter, includes a transmission coil; switches coupling a power source to the transmission coil; a signal generator configured: to operate at least one of the switches to selectively couple the power source to the transmission coil via a current path to inject a non-zero first coil voltage into the transmission coil to radiate a magnetic field; and, to operate the switches to decouple the power source from the transmission coil and reconfigure the current path into a loop path trapping a residual current to prolong the magnetic field with a second coil voltage, wherein the second coil voltage is substantially zero.

The information transmitter may further include an input resistor coupled between the power source and the switches, the signal generator being further configured to decouple the loop path from the input resistor.

The signal generator may be further configured to apply the first coil voltage to the transmission coil for a first time constant and the second coil voltage for a second time constant, wherein the second time constant is greater than the first time constant.

The signal generator may be further configured to operate the switches to reconfigure the current path to reverse a polarity of the first coil voltage and reconfigure the loop path to reverse a polarity of the second coil voltage.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments are described in detail with reference to the accompanying drawings.

Figure 1A:
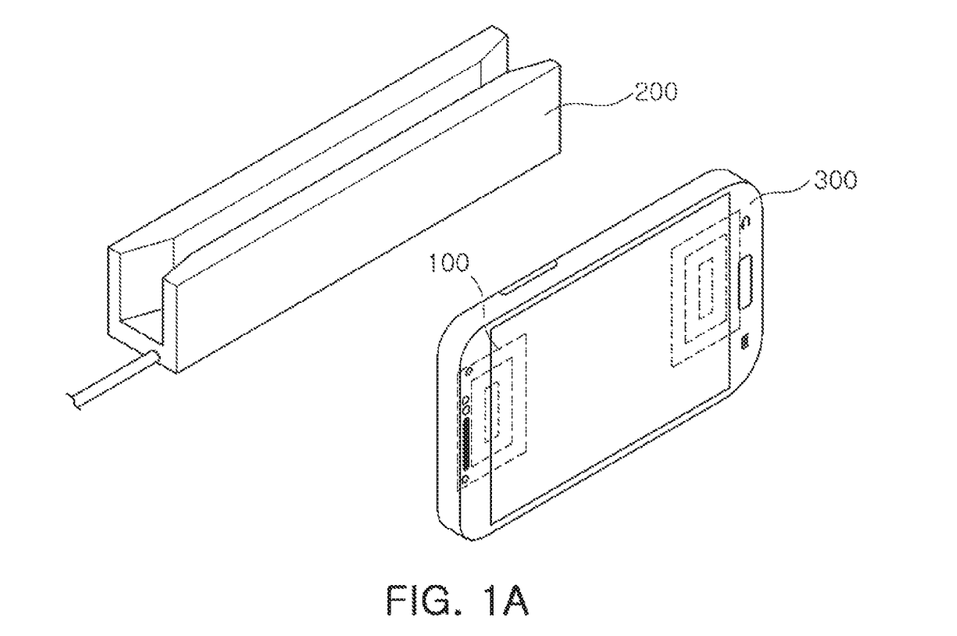
FIG. 1A is a perspective view illustrating an example in which a mobile terminal using a coil for wireless communications performs wireless communications.

FIG. 1A is a perspective view illustrating an example in which a mobile terminal using a coil for wireless communications performs wireless communications.

In FIG. 1A, an information transmitter 100 is applied to a mobile terminal 300. The information transmitter 100 forms a magnetic field under the control of the mobile terminal 300.

The information transmitter 100 is operable as a transmitting coil, and is magnetically coupleable to a wireless signal receiver including a receiving coil to thereby wirelessly transmit information.

A wireless signal receiver including the receiving coil, a magnetic card reader 200, is illustrated in FIG. 1A. According to an embodiment, the wireless signal receiver includes the receiving coil. Various wireless signal receivers may be used in addition to the magnetic card reader 200.

The information transmitter 100 includes at least one transmitting coil. The transmitting coil transmits information to the magnetic card reader 200 of in a non-contact manner by forming the magnetic field to provide a magnetic input to a magnetic head of the magnetic card reader 200.

The information transmitter 100 transmits data to the magnetic card reader 200, e.g., card number data, by changing a direction of the magnetic field. In other words, the magnetic card reader 200 generates the card number data using a change in a voltage across the receiving coil caused by the change in the direction of the magnetic field formed by the information transmitter 100. A description thereof is provided below with reference to FIG. 2.

Figure 1B:
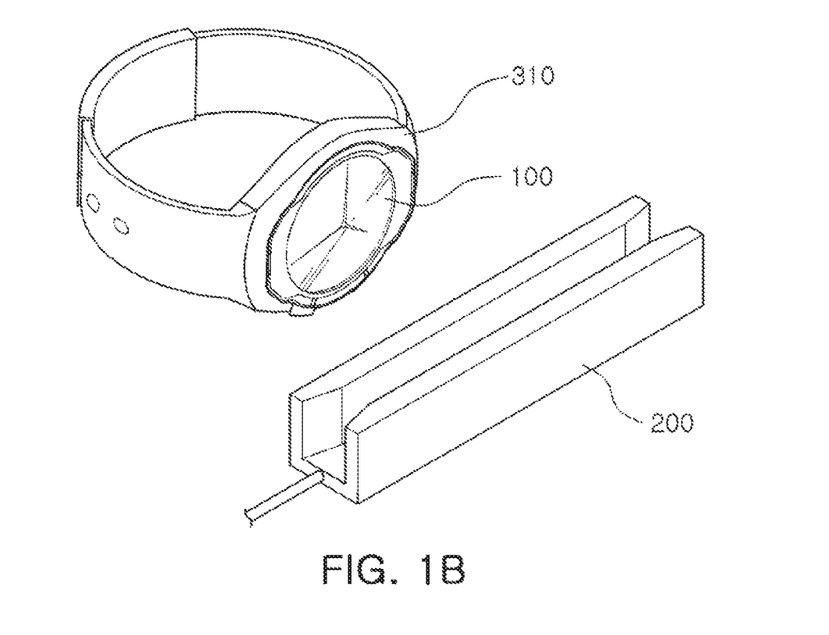
FIG. 1B is a perspective view illustrating an example in which a wearable device using a coil for wireless communications performs wireless communications.

FIG. 1B is a perspective view illustrating an example in which a wearable device using a coil for wireless communications performs wireless communications.

In FIG. 1B, the information transmitter 100 is applied to a wearable device 310. The information transmitter 100 forms a magnetic field under the control of the wearable device 310.

The wearable device 310 may be an electronic device which is worn on a body, such as on an arm, a head, or the like, or is fixed to a specific structure by a strap. Hereinafter, the wearable device according to the present disclosure is described assuming that it has a shape of a watch, but is not limited thereto.

The information transmitter 100 is operated as a transmitting coil, and is magnetically coupleable to a wireless signal receiver (for example, the magnetic card reader 200 in the illustrated example) including a receiving coil, to thereby wirelessly transmit information.

The information transmitter 100 forms the magnetic field using the transmitting coil so as to be magnetically coupled to the magnetic card reader 200.

Hereinafter, an operation of the magnetic card reader is described with reference to FIG. 2.

Figure 2:
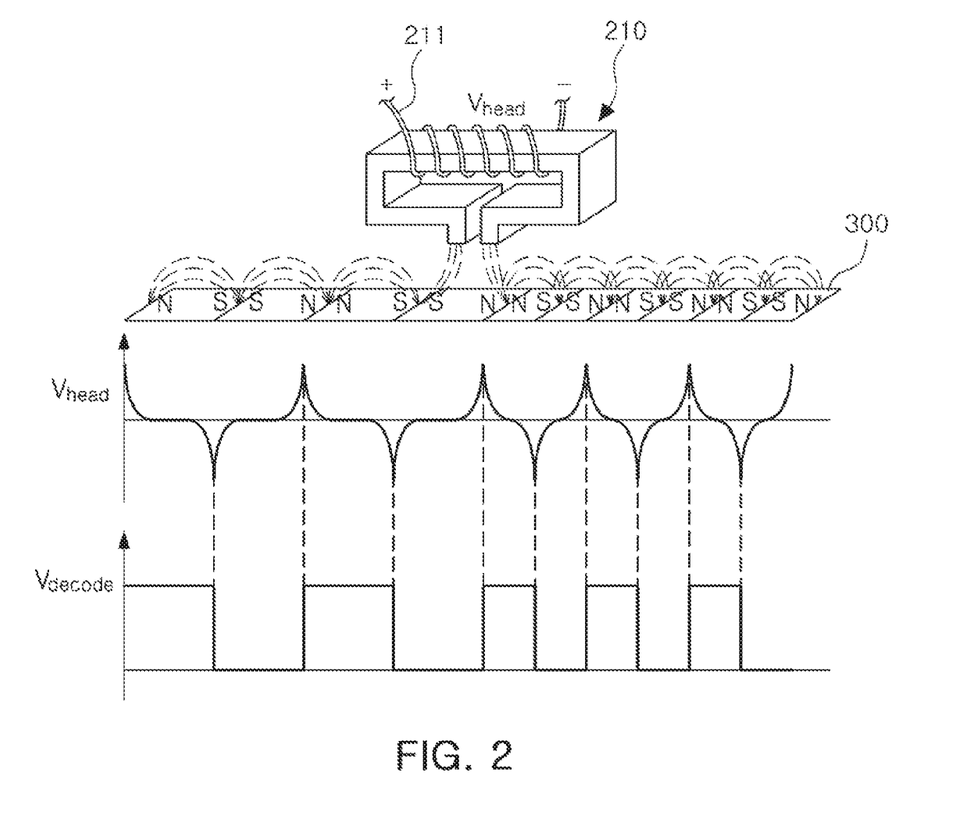
FIG. 2 is a view illustrating an example of a magnetic head of a magnetic card reader that reads card information from a magnetic card.

FIG. 2 illustrates the magnetic head 210 of the magnetic card reader that reads card information from a magnetic card, and head voltage $V_{head}$ caused in the magnetic head by the magnetic card.

The magnetic card reader 200 (FIG. 1A) includes the magnetic head 210 and an analog-digital converter.

The magnetic head 210 generates a voltage by subtending magnetic flux. That is, the magnetic head 210 includes a receiving coil 211, and as the magnetic head passes through a magnetic stripe 300, the magnetic field impacts on the magnetic head 210 to cause a current to be generated in the receiving coil 211. The head voltage $V_{head}$ across the receiving coil 211 is detected by the current generated in the receiving coil.

When the receiving coil 211 of the magnetic head 210 experiences a change in the magnetic field, a voltage $V_{head}$ across the receiving coil 211 is generated by the magnetic flux.

The generated voltage $V_{head}$ across the receiving coil 211 is provided to the analog-digital converter, and the analog-digital converter generates a decoded signal $V_{decode}$ from the voltage across the receiving coil 211. The decoded signal $V_{decode}$ may be, for example, a digital voltage signal, and card information data may be generated from the decoded signal $V_{decode}$.

Meanwhile, the magnetic card may have a magnetized magnetic stripe 300.

As the magnetic stripe 300 moves over the magnetic head 210, the voltage $V_{head}$ across the receiving coil 211 of the magnetic head 210 is generated by the magnetic flux.

Meanwhile, the voltage $V_{head}$ across the receiving coil 210 has a peak voltage, depending on polarities of the magnetic stripe 300. For example, as in the illustrated example, in a case in which the same polarities are adjacent to each other—S to S or N to N—, the voltage $V_{head}$ across the receiving coil has the peak voltage.

The analog-digital converter generates the decoded signal $V_{decode}$ from the voltage $V_{head}$ across the receiving coil. For example, the analog-digital converter generates an edge whenever the peak voltage is detected, to generate the decoded signal $V_{decode}$.

The decoded signal $V_{decode}$ is a digital voltage signal from which digital data is decoded.

For example, depending on a length of a constant of the decoded signal $V_{decode}$, a '1' or '0' may be decoded. It may be seen from an illustrated example that a first constant and a second constant of the decoded signal $V_{decode}$ are two times a third constant thereof. As an example, the first constant and the second constant of the decoded signal $V_{decode}$ may be decoded to '1', and a third constant to a fifth constant may be decoded to '0'. Such a decoding method is only illustrative, and it should be apparent to one of skill in the art, after gaining a full understanding of the disclosure, that various decoding technologies may be applied.

As such, the magnetic head 210 included in the magnetic card reader detects the head voltage $V_{head}$ from the magnetic field to receive predetermined information (e.g., card number data).

Meanwhile, while FIG. 2 illustrates an example in which the decoding is performed from the magnetic stripe of the magnetic card, the magnetic head 210, according to an embodiment, generates the voltage across the receiving coil from an influence of the magnetic field generated by the information transmitter 100, to receive the predetermined information data (e.g., card number data, transaction data, subscriber information data, encrypted token data, and other suitably identifying informational data).

That is, the magnetic head 210 of the magnetic card reader is magnetically coupled to the transmitting coil of the wireless communication antenna to receive data—e.g., card number data.

To this end and others, the information transmitter 100 applies the magnetic field similarly, in the case in which the same polarities are adjacent to each other in the magnetic stripe, by performing a control so that the direction of the generated magnetic field is changed. As such, the information transmitter 100 transmits the information data to the magnetic card reader 200, e.g., card number data, by changing the direction of the generated magnetic field. Alternatively, or in addition, the magnetic field strength, direction, or other suitable characteristic may be modulated to encode the data as would be apparent to one of skill in the art after gaining a thorough understanding of the disclosure.

Figure 3:
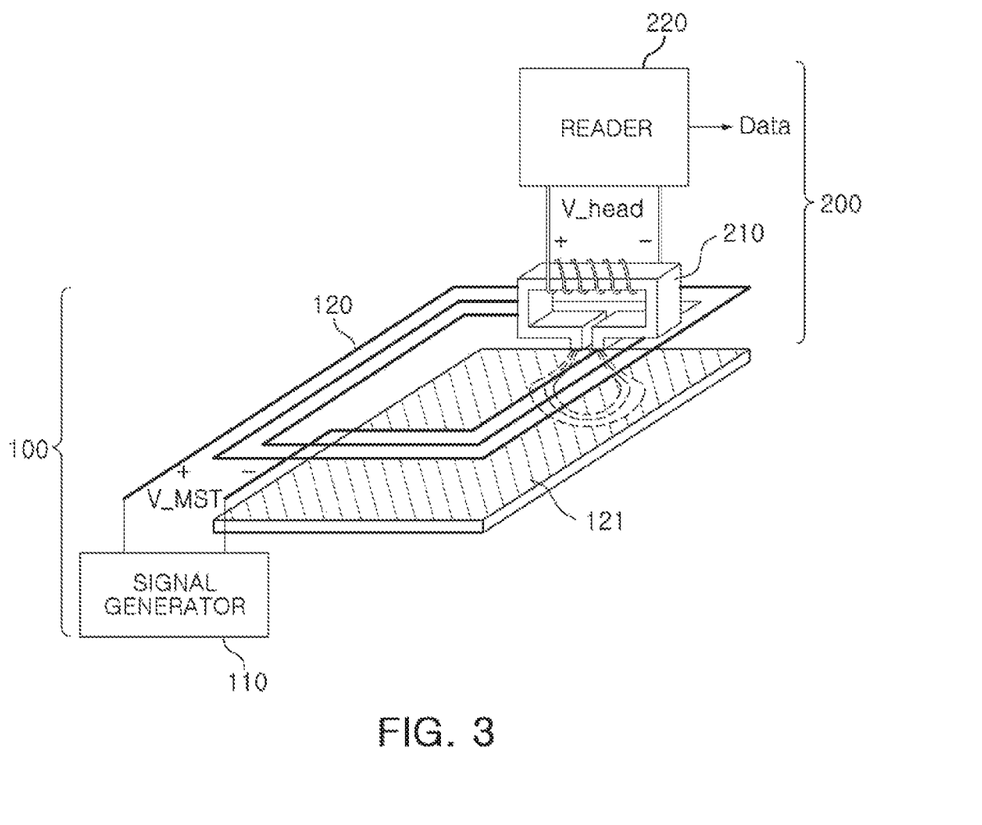
FIG. 3 is a view illustrating an example of an information transmitter.

FIG. 3 is a view illustrating an example of an information transmitter.

Referring to FIG. 3, the information transmitter 100 includes a signal generator 110, a transmitting coil 120, and a magnetic body 121.

An information receiver 200, for example, the magnetic card reader 200 (illustrated in FIG. 1A) includes a magnetic head 210 and a reader 220.

The information transmitter 100 changes a direction of the magnetic field depending on information intended to be transmitted. The information intended to be transmitted may be encrypted information for payment, such as credit card information.

The signal generator 110 generates an information signal V_MST, corresponding to the information intended to be transmitted, and applies the information signal V_MST to the transmitting coil 120. For example, the information signal V_MST may be a signal of which a voltage is changed, or may be a signal of which a current is changed according to the information intended to be transmitted to modulate the information data A change in the magnetic field is generated around the transmitting coil 120 according to the information signal V_MST. That is, in a case in which the information signal V_MST, of which the voltage or the current is changed, is applied to the transmitting coil 120, a magnetic flux is generated around the transmitting coil 120 due to Ampere's circuital law.

The transmitting coil 120, according to embodiments, may be one coil wound about one axis, and, in addition to a spiral coil, as illustrated, various coils such as a solenoid coil, a 3-dimensional (3D) coil, a composite coil, and other suitable coil structures may be used.

The magnetic body 121 is disposed over one surface of the transmitting coil 120.

Residual magnetic density and saturation magnetic density of the magnetic body 121 may occur in a predetermined range.

The information receiver 200 outputs data in response to the change in the magnetic field generated by the information transmitter 100.

The magnetic head 210 has, according to an embodiment, a structure in which a coil is wound around a core, as illustrated in FIG. 3. Since a voltage V_head across the coil of the magnetic head 210 is varied according to the change in the magnetic field around the coil of the magnetic head 210, the magnetic head 210 outputs the voltage V_head in response to the change in the magnetic field.

The reader 220 s the data in response to the voltage V_head across the coil of the magnetic head 210. For example, the reader 220 senses the voltage V_head across the coil of the magnetic head 210, and converts the sensed voltage into a digital signal, to output the data through the use of an analog to digital converter (ADC). The data is, for example, card information. The reader 220, according to another embodiment outputs the data in response to a current flowing in the coil of the magnetic head 210.

In a case in which the information signal of which the voltage or the current is changed is applied to the transmitting coil 120, according to the information intended to be transmitted, the magnetic flux is generated around the transmitting coil 120 according to Ampere's circuital law, and in a case in which the magnetic flux is applied to a head portion of the magnetic head 210, the voltage V_head across the coil of the magnetic head 210 is generated. However, a marked improvement in efficiency is brought about by significantly reducing power consumed in the above-mentioned operations. The need for power reduction may be particularly acute in a case in which the information transmitter is applied to a mobile device such as a smartphone, or a small IT device such as a smart watch, cufflink, ring, eyewear, headphone, or other device.

A technology of forming the magnetic field by generating the information signal V_MST, to apply the information signal V_MST to the transmitting coil 120, and transmitting the information data such as card information to the magnetic head 210, is hereinafter referred to as a magnetic secure transmission (MST).

The MST may have an advantage that an existing magnetic reader (such as a magnetic card swipe reader) may be used as the information receiver 200, as it is without modification or expenditure on infrastructure upgrade.

Figure 4:
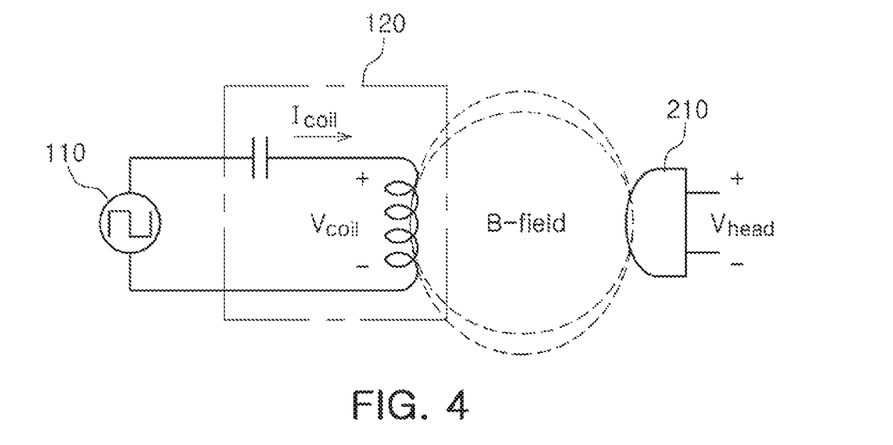
FIG. 4 is a view schematically illustrating an example of a coupled state of the information transmitter, such as the one illustrated in FIG. 3 and a magnetic head.

FIG. 4 is a view schematically illustrating an example of a coupled state of the information transmitter illustrated in FIG. 3 and the magnetic head 210.

Referring to FIG. 4, the signal generator 110 applies a coil current $I_{coil}$ to the coil, and the coil generates a magnetic field (B-field). In addition, a voltage $V_{coil}$ across the coil is generated.

The magnetic head 210 generates the head voltage $V_{head}$ from the magnetic field (B-field), and employs the reader to decode the information data according to the head voltage $V_{head}$, as described above.

In order to transmit the information data as described above, the information transmitter, according to an embodiment, changes a direction of the magnetic field (B-field). Therefore, because the generation and the change of the magnetic field generally occur frequently, a demand on power consumption is significant.

However, the information transmitter according to an embodiment beneficially reduces the power consumption by setting time constants or periods of operation differently according to a changed state of the magnetic field. A time "constant" is a definite period of time, such as a number of seconds, milliseconds, nanoseconds, or the like.

The magnetic field is, according to an embodiment, effectively maintained for a longer period of time by setting a second time constant, when the magnetic field generated using a loop current path is maintained to be greater than a first time constant, when the magnetic field is generated using input power to reduce consumption speed of the current.

Hereinafter, the information transmitter according to an embodiment is described further with reference to FIGS. 5 through 7.

Figure 5:
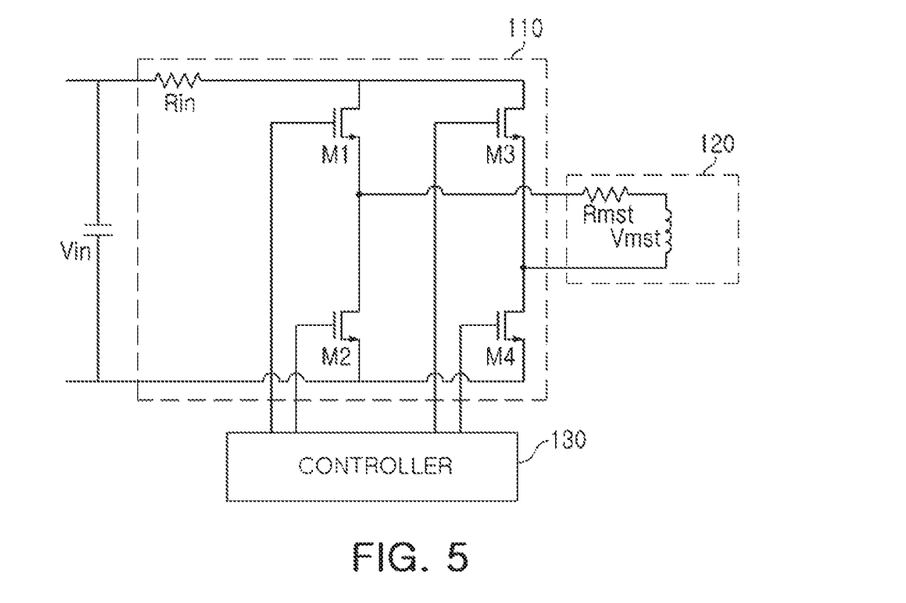
FIG. 5 is a circuit diagram illustrating an example of an information transmitter.

FIG. 5 is a circuit diagram illustrating an example of an information transmitter.

Referring to FIG. 5, the information transmitter 100 includes the signal generator 110 and the transmitting coil 120. According to an embodiment, the information transmitter 100 further includes a controller 130.

The signal generator 110 receives a direct current (DC) voltage, and operates a plurality of switches M1-M4 to apply the coil voltage to the transmitting coil 120. The transmitting coil 120 is applied with the coil voltage to generate the magnetic field, and transmits information data wirelessly to the information receiver, such as the magnetic card reader, via the magnetic field.

The signal generator 110 includes an input resistance Rin and switches M1 to M4 connected thereto.

A first switch M1 has one terminal (such as a source or collector) connected to the input resistance Rin, and another terminal (such as a drain or emitter) connected to one terminal of the transmitting coil.

A second switch M2 has one terminal (e.g. source or collector) connected to the other terminal of the first switch M1 and to one terminal of the transmitting coil.

A third switch M3 has one terminal (e.g. source or collector) connected to the input resistance Rin, and the other terminal (e.g. drain or emitter) connected to the other terminal of the transmitting coil.

A fourth switch M4 has one terminal (e.g. source or collector) connected to the other terminal of the transmitting coil, and the other terminal (e.g. drain or emitter) connected to the other terminal (e.g. drain or emitter) of the second switch M2.

Meanwhile, in the information transmitter 100, a first time constant, duration, or period, in a first current path in which the coil voltage is applied to the transmitting coil, and a second time constant, duration, or period, in a second current path in which the coil voltage is not applied to the transmitting coil (though a residual current remains), according to embodiment, are different from each other. In other words, the coil voltage during the second time constant is substantially zero (having the Vin power source and Rin resistance decoupled) although the residual current remains in the loop path.

For example, the first time constant (where the coil voltage is applied) is established to be smaller than the second time constant (where the coil voltage is not applied). In other embodiments, the coil voltage during a first time constant is different than the second coil voltage during the second time constant.

Figure 6A:
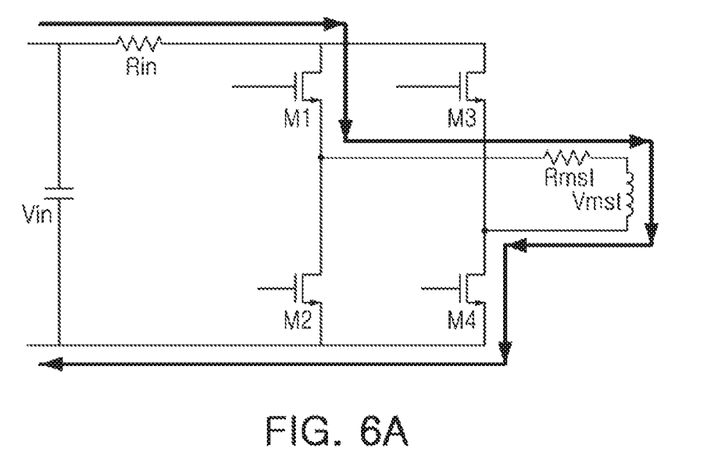
FIGS. 6A to 6D are views illustrating examples of various current paths applied to an information transmitter, such as the one illustrated in FIG. 5.
Figure 6B:
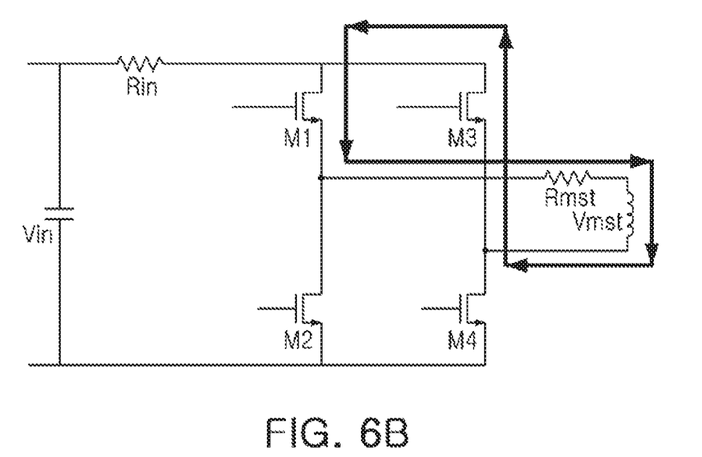

Referring further to FIGS. 6A and 6B, FIG. 6A illustrates the first current path, in which the coil voltage having a first value is applied to the transmitting coil, and FIG. 6B illustrates the second current path, in which the coil voltage has a second value smaller than the first value. The second value of the coil voltage is, according to an embodiment, zero or close to zero.

The first current path, illustrated in FIG. 6A, is formed by operating the first switch M1 and the fourth switch M4 in an ON state and the second switch M2 and the third switch M3 in an OFF state.

When the first current path is activated, the coil current flows in the transmitting coil 120 by an input voltage Vin, and, as a result, the magnetic field is generated.

A time constant t1 in the first current path in which the coil voltage is applied to the transmitting coil, as illustrated in FIG. 6A, is expressed, according to an embodiment, as follows.

$$t1 = Lmst/(Rin + Rmst) \quad \text{[Equation 1]}$$

That is, as illustrated in FIG. 6A, since both input resistance Rin and parasitic resistance Rmst of the transmitting coil exist on the first current path, the time constant t1 in the first current path may be expressed as in Equation 1.

The second current path, illustrated in FIG. 6B, may be formed after the first current path, and is formed by switching the fourth switch M4 to the OFF state and the third switch M3 to the ON state.

Such a second current path, which is a case in which the coil voltage is not applied to the transmitting coil part, is, according to an embodiment, a loop path, and a pre-generated, or residual, magnetic field may be maintained for a predetermined time using the loop path after the path is disconnected from Vin power source and the Rin resistor. That is, the coil current flowing in the transmitting coil in the second current path is gradually discharged by the loop path, but since the second current path has a time constant greater than the time constant t1 in the first current path, the discharge of the current is delayed or prolonged and the pre-generated magnetic field is maintained for a relatively longer period of time.

A time constant t2 in the second current path may be expressed as in Equation 2.

$$t2 = Lmst/Rmst \qquad \text{[Equation 2]}$$

Here, Rmst, which is the parasitic resistance generated by the transmitting coil, has a resistance value sufficiently smaller than the input resistance Rin. Therefore, the time constant t2 in the second current path has a value sufficiently greater than the time constant t1 in the first current path. Accordingly, loss in the magnetic field maintained by the second current path, which is the loop path, is significantly decreased, and the magnetic field generated by the first current path may be thus maintained for a sufficiently long period of time by the second current path. FIG. 7 shows examples of switching timings, levels of currents, voltages, etc.

As a result, by setting the time constants to be different from each other according to the current path, the time constant t1, in the case in which the voltage is applied to the transmitting coil, and the time constant t2, in the case in which the voltage is not applied to the transmitting coil, and how long the magnetic field may be maintained may be different from each other.

That is, the time constant t1 in the first current path is smaller than the time constant t2 in the second current path. Therefore, the magnetic field is, nonetheless, effectively maintained by setting the time constant in a section in which the voltage is applied to be small, and setting the time constant in a state in which the voltage is not applied to be large, to significantly reduce reduction speed of the coil current in the second current path.

Figure 6C:
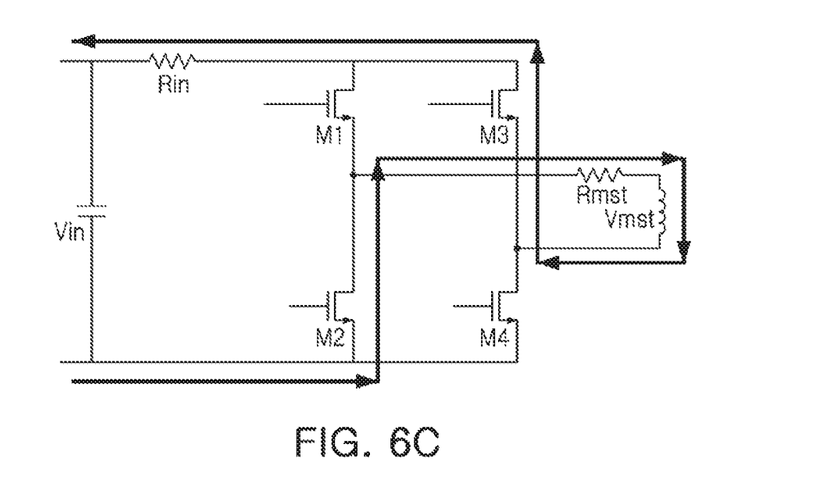

A path illustrated in FIG. 6C is a third current path, in which the coil voltage having a third value of which sign or polarity is opposite to the sign of the first value is applied to generate a magnetic field of an opposite direction.

The third current path is formed, according to an embodiment, after the second current path, and is formed by switching the first switch M1 to the OFF state and the second switch M2 to the ON state.

That is, the third current path is a path in which the coil voltage applied by the first current path is offset, and a coil voltage having an opposite polarity is applied, and a time constant t3 of the third current path may, according to an embodiment, be the same as the time constant t1 in the first current path.

Figure 6D:
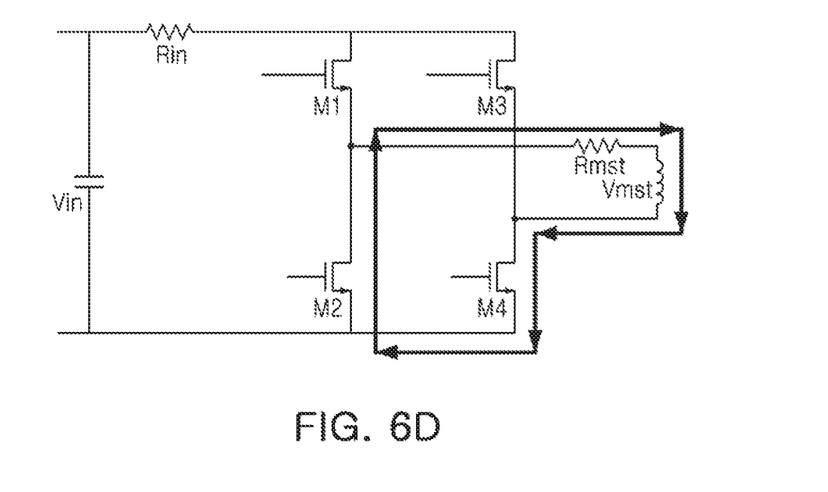

In addition, a path illustrated in FIG. 6D illustrates a fourth current path, in which the coil voltage is the coil voltage having a fourth value smaller than the third value. The fourth value of the coil voltage is zero or close to zero.

The fourth current path is formed after the third current path, and is formed by switching the third switch M3 to the OFF state and the fourth switch M4 to the ON state.

Similarly, a time constant t4 in the fourth current path is substantially the same as the time constant t2 in the second current path.

As a result, the time constant t1 in the first current path corresponds to the time constant t3 in the third current path, and the time constant t2 in the second current path corresponds to the time constant t4 in the fourth current path.

Such correspondence is maintained by configuring the circuit such that the input resistance Rin exists on the first and third path, in the case in which the voltage is applied to the transmitting coil to generate the magnetic field, while the input resistance Rin does not exist on the second and fourth path, in a case in which the voltage is not applied to the transmitting coil and the generated magnetic field is maintained.

In other words, the time constants in the first current path and the third current path are determined by the coil resistance Rmst of the transmitting coil part and the input resistance Rin included in the signal generator.

In contrast, the time constants in the second current path and the fourth current path are determined by the coil resistance Rmst of the transmitting coil part.

As such, an amount of change of the generated magnetic field is decreased by setting the time constant, when the voltage is applied to the transmitting coil, and the time constant, when the voltage is not applied to the transmitting coil, to be different from each other, whereby the magnetic field may be accurately generated by applying a small injection or initial pulse voltage.

Figure 7:
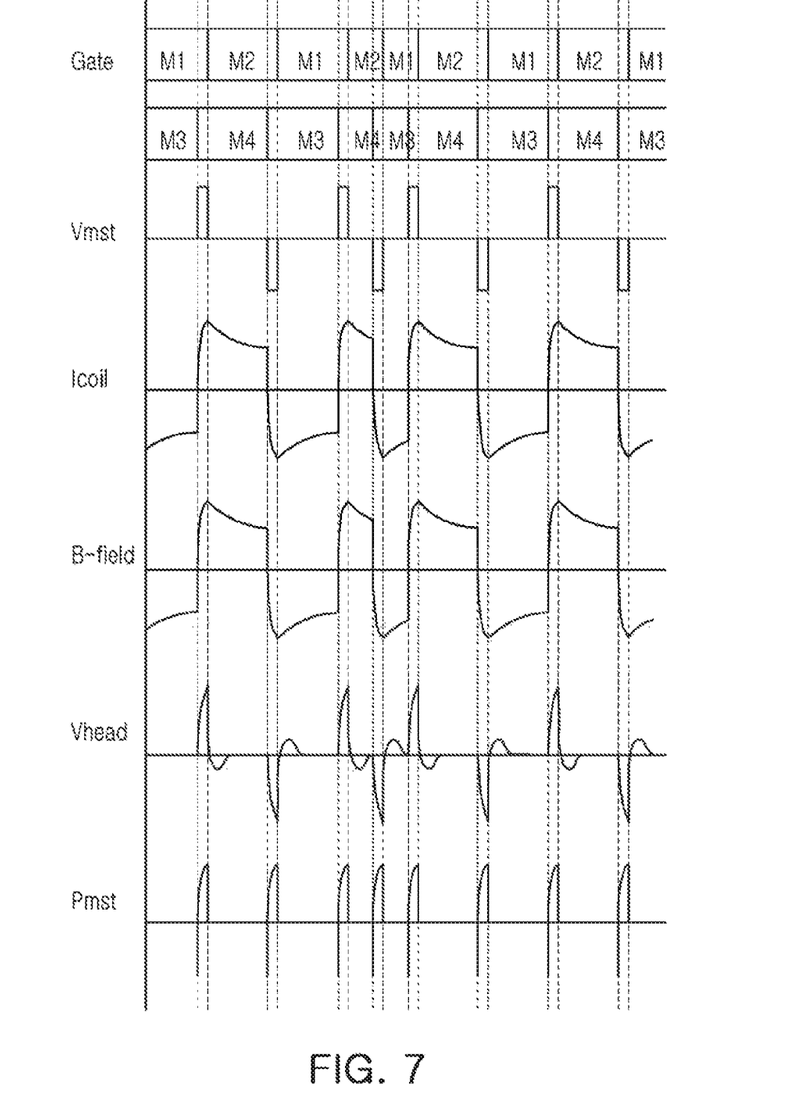
FIG. 7 is a graph illustrating examples of waveforms of input and output signals, such as in the circuit diagram illustrated in FIG. 5.

FIG. 7 is a graph illustrating waveforms of input and output signals in the circuit diagram illustrated in FIG. 5. Hereinafter, a description will be made with reference to FIG. 7.

First, if a gate signal (waveform Gate as illustrated) is applied, the voltage Vmst of a pulse waveform is applied to the transmitting coil by sequentially and alternately operating the switches, as described above.

The coil current $I_{coil}$ flows in the transmitting coil by the voltage across the transmitting coil as illustrated, and the magnetic field (B-field) is generated in response to the coil current $I_{coil}$.

Compared to the current paths described above, in a case in which the first switch M1 and the fourth switch M4 are in the ON state, the coil voltage Vmst is applied to the transmitting coil and, in this case, the coil current $I_{coil}$ is rapidly increased by the first current path. Accordingly, the magnetic field (B-field) is rapidly increased while the polarities thereof are reversed.

When the first switch M1 is switched to the OFF state and the second switch M2 is switched to the ON state, the second current path, in which the coil voltage is not applied to the transmitting coil, is activated. In the second current path, the coil current $I_{coil}$ is gently decreased due to an influence of the parasitic resistance appearing in the transmitting coil (in the absence of the input resistance Rin). Similarly, the magnetic field (B-field) in the second current path is gradually decreased.

As a result, a first amount of change of the coil current flowing in the transmitting coil by the first current path is different from a second amount of change of the coil current flowing in the transmitting coil part by the second current path. That is, the first amount of change of the coil current is greater than the second amount of change of the coil current.

In response to the change in the coil current, a first amount of change of the magnetic field caused by the first current path is greater than a second amount of change of the magnetic field caused by the second current path.

As the fourth switch M4 is switched to the OFF state and the third switch M3 is switched to the On state, the third current path is activated. A voltage having the polarity opposite to the first current path but having substantially the same magnitude as the first current path is applied to the transmitting coil by the third current path, and the coil current $I_{coil}$ is rapidly increased in an opposite direction. Accordingly, the magnetic field (B-field) is rapidly increased while the polarities thereof are reversed.

Next, as the second switch M2 is switched to the OFF state and the first switch M1 is switched to the ON state, the fourth current path is activated. Accordingly, the coil current and the magnetic field caused by the third current path is slowly decreased.

As a result, since the time constant when the magnetic field (B-field) is maintained, that is, when the coil current $I_{coil}$ is gradually discharged by the loop path, is greater than the time constant when the coil voltage Vmst is applied, a reduction amount of the coil current $I_{coil}$ and the magnetic field (B-field) follows a relatively gentle slope.

Therefore, the magnetic head voltage applied to the magnetic head may be more accurately detected as illustrated and, as a result, an information data signal Pmst may also be more accurately detected.

As set forth above, according to embodiments, the information transmitter transmits the information data at a significantly reduced power cost.

Further, the information transmitter may provide for enhanced accuracy of the information transmission by adjusting the amount of change of the magnetic field.

The signal generator 110, controller 130, and reader 220 in FIGS. 3 and 5, respectively that perform the operations described in this application are implemented by hardware components configured to perform the operations described in this application that are performed by the hardware components. Examples of hardware components that may be used to perform the operations described in this application, where appropriate, include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-4 and 6A-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An information transmitter, comprising:
    a transmitting coil configured to receive a coil voltage to generate a magnetic field; and
    a signal generator configured to apply the coil voltage to the transmitting coil, the signal generator including,
        an input resistance,
        a first switch comprising a first-first terminal connected to the input resistance and a first-second terminal connected to a first terminal of the transmitting coil,
        a second switch comprising a second-first terminal connected to the first-second terminal of the first switch and a second-second terminal of a second terminal of transmitting coil,
        a third switch comprising a third-first terminal connected to the input resistance and a third-second terminal connected to the second terminal of the transmitting coil, and
        a fourth switch comprising a fourth-first terminal connected to the second terminal of the transmitting coil and a fourth-second terminal connected to the second-second terminal of the second switch,
    wherein a first time constant of a first current path to which the coil voltage having a first magnitude is applied is different from a second time constant of a second current path to which the coil voltage having a second magnitude, which is smaller than the first magnitude, is applied.

2. The information transmitter of claim 1, wherein the first time constant is less than the second time constant.

3. The information transmitter of claim 2, wherein the signal generator is further configured to apply the coil voltage having a third magnitude to the transmitting coil for a third time constant of a third current path,
    the third magnitude has an opposite polarity to the first magnitude, and
    the third time constant is less than the second time constant in the second current path.

4. The information transmitter of claim 3, wherein the signal generator is further configured to apply the coil voltage having a fourth magnitude to the transmitting coil for a fourth time constant of a fourth current path,
    the fourth magnitude is less than the third magnitude, and
    the fourth time constant is greater than the first time constant.

5. The information transmitter of claim 4, wherein the first time constant corresponds to the third time constant, and
    the second time constant corresponds to the fourth time constant.

6. The information transmitter of claim 1, wherein the first time constant is determined by a coil resistance of the transmitting coil and the input resistance included in the signal generator, and
    the second time constant is determined by the coil resistance of the transmitting coil.

7. The information transmitter of claim 1, wherein the first current path is formed by operating the first switch and the fourth switch in an ON state and the second switch and the third switch in an OFF state.

8. The information transmitter of claim 7, wherein the second current path is formed after the first current path, and is formed by switching the fourth switch to the OFF state and switching the third switch to the ON state.

9. The information transmitter of claim 8, wherein the signal generator is further configured to form a third current path after the second current path, by switching the first switch to the OFF state and switching the second switch to the ON state.

10. The information transmitter of claim 9, wherein the signal generator is further configured to form a fourth current path after the third current path, by switching the third switch to the OFF state and switching the fourth switch to the ON state.

11. The information transmitter of claim 1, wherein a first amount of change of the magnetic field caused by the first current path is greater than a second amount of change of the magnetic field caused by the second current path.

* * * * *